Aug. 7, 1923.
A. E. GOODGER
1,464,131
CRANE FOR VEHICLES, TRUCKS, AND THE LIKE
Filed Sept. 26, 1922     3 Sheets-Sheet 1
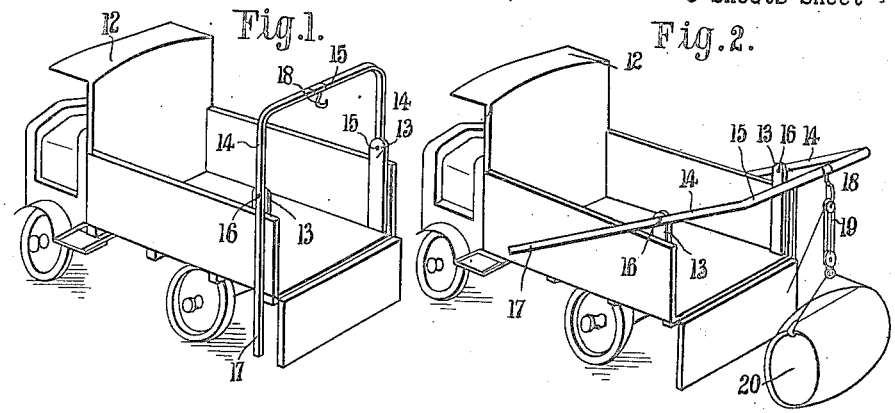
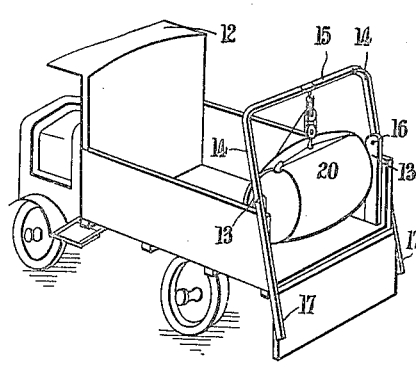
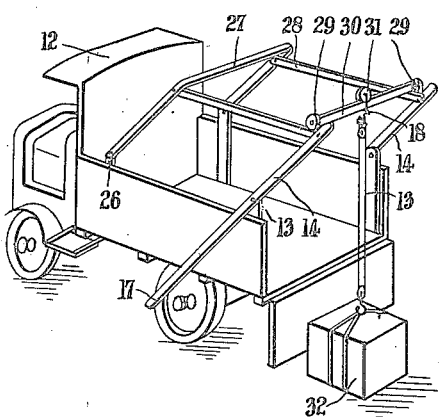
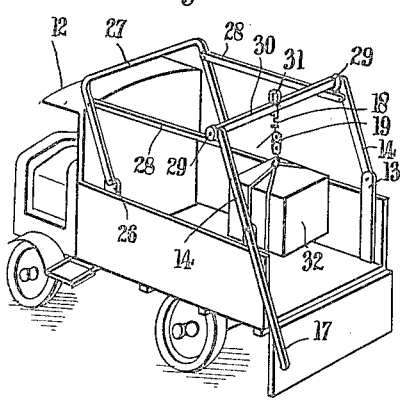
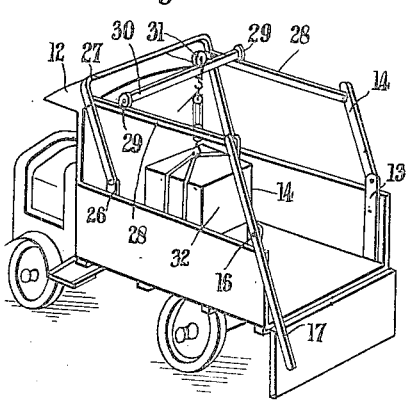

Aug. 7, 1923.

A. E. GOODGER

CRANE FOR VEHICLES, TRUCKS, AND THE LIKE

Filed Sept. 26, 1922    3 Sheets-Sheet 2

1,464,131

Inventor—
Albert Edward Goodger
By— B. Singer. Atty.

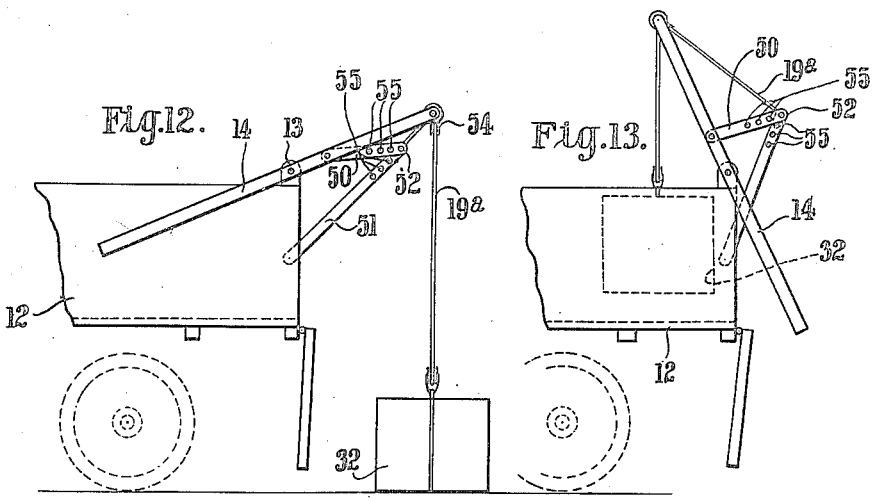
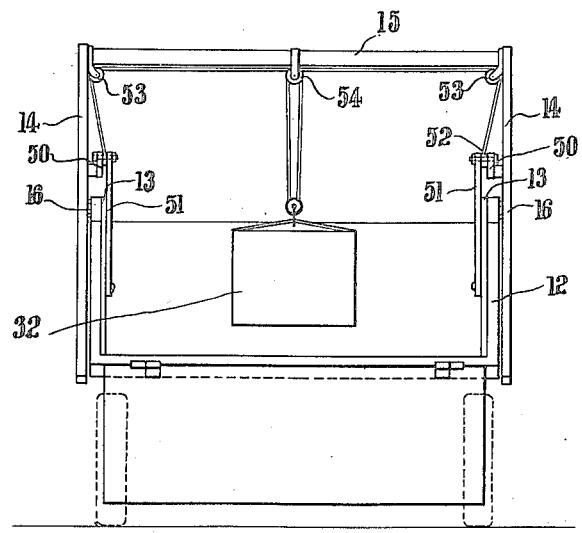

Patented Aug. 7, 1923.

1,464,131

UNITED STATES PATENT OFFICE.

ALBERT EDWARD GOODGER, OF LONDON, ENGLAND.

CRANE FOR VEHICLES, TRUCKS, AND THE LIKE.

Application filed September 26, 1922. Serial No. 590,659.

*To all whom it may concern:*

Be it known that I, ALBERT EDWARD GOODGER, a subject of the King of Great Britain and Ireland, residing at 66 Grantham Road, London, S. W. 9, England, have invented certain new and useful Improvements in and Relating to Cranes for Vehicles, Trucks, and the like (for which I have filed application in Great Britain Sept. 7, 1921, application No. 23,819, and April 6, 1922, application No. 9,901), of which the following is a specification.

This invention relates to cranes for road, railway or other vehicles or trucks, but which is especially useful for road vehicles and warehouse trucks and which moreover is simple to construct, easily fitted to existing vehicles and readily manipulated, greatly facilitating loading and unloading with the minimum amount of time and labour.

According to the invention the crane consists of a substantially U shaped member suitably pivoted to the sides or other part of the vehicle or the like in such a way that in the vertical position the U is inverted, the two limbs of the U coming on each side of the vehicle to which they are pivoted.

This inverted U member is so located that when turned about its pivots in one direction the portion connecting the limbs at the top projects beyond the vehicle whilst when turned in the reverse direction this portion comes within the vehicle.

In this manner suitable tackle carried by the portion connecting the limbs of the U is enabled to be brought directly over loads outside the vehicle to be connected thereto and drawn up if desired and then swung into the vehicle, by turning the crane on its pivots, the load then if necessary being lowered on to the vehicle, the tackle preferably being of such a nature that it can move along transversely on the upper bar portion between the side limbs so as to dispose of the load in a desired position.

Any suitable means may be employed for turning the crane on its pivots, for example one or both side limbs may be extended downwards below the pivots to constitute manipulating handles, suitable reversible ratchet and pawl engaging means being provided for facilitating operations and retaining the parts in any desired positions.

In other cases these downward extensions may be operated by pulleys and tackle arranged in convenient form, for example a pulley drum may be attached to a suitable pivot on the end of one or both of the downward extensions. One end of a suitable rope, cable, chain or the like is attached to the drum and the other to a fixed point towards the rear of the vehicle. From the position with the crane projecting to a maximum extent over the end of the vehicle, it will be seen that upon winding up the rope or the like upon the drum, by means of a suitable winch handle, the crane will gradually be brought to the vertical position, lifting the load and then upon unwinding, and suitably directing the crane, this can be turned in the reverse direction and the load lowered on to the vehicle.

Worm or other toothed gearing suitably disposed can also be employed for the purpose, either alone or in combination with any of the other means or in some cases nut and a screw rod engagement could be employed.

It will be understood that the precise nature of the means for moving the crane on its pivots will depend on the vehicle to which it is fitted, the strength of the crane and the nature of the loads likely to be lifted. For example with a light vehicle for dealing with comparatively light loads, only an arrangement with slight mechanical advantage need be employed, whilst where heavy loads have to be lifted any arrangement giving the requisite mechanical advantage could be employed. Further, where required the manipulation could be effected from both sides of the vehicle at once.

In addition to the pivoting action, the crane may be movable along the vehicle, so that after lifting, the load could be moved along the vehicle to a desired point.

To carry out the same action however, runners suitably supported by uprights on the vehicle could be employed, having travelling supporter bars disposed across them, which latter could be suitably attached to the top bar of the crane and have the lifting tackle attached thereto. These transporter bars could move with the crane and lift the load, after which they would be lowered on to the runners, and the bars preferably provided with wheels could then be pushed or drawn along the runners to the desired place on the vehicle, when the load could be lowered.

With a preferred arrangement however, a somewhat similar inverted U member is provided, pivoted across the vehicle further from the back than the first member and coming towards the front of the vehicle, this second member being jointed by link bars, constituting runners, to the inverted U forming the crane. The link bars are either attached to the limbs or to the top members. In this manner a parallel link motion is formed and the two inverted U members move about their pivots parallel to one another. In some cases more than two members could be used or more than two link bars.

The two link bars forming runners carry a transverse transporter bar by means of suitably flanged wheels. The transporter bar has running thereon a flanged wheel supporting the raising tackle.

With this form of device it will be seen that when the rear inverted U crane is moved to project beyond the vehicle, to pick up a load the whole structure moves in a parallel manner. The movement may be imparted to the rear U member on one or both sides or in a similar manner to the front U member or to both.

The transporter bar with the lifting tackle is pushed to the extreme end and comes against the rear U member. The hook or other corresponding part of this tackle is engaged with the load and if desired the tackle manipulated to lift the load for a certain vertical distance, when the operating rope or the like of the tackle can be engaged with a holding device, for instance a cleat carried by the portion of the tackle coming on the transporter bar.

The load is then swung inboard, as previously described. The inboard swinging may be in some cases sufficient to raise the load from the ground and obviate the necessity of lifting the load by the tackle.

When the load is swung inboard, the inverted U members may be stopped in the vertical position or just beyond it, for example by suitable pins or the like and a quadrant and the transporter drawn over the runners by hand or by other tackle engaging the front or other part of the vehicle and the transporter, to the desired position, at which the load can be lowered, the tackle supporting the load also being movable transversely along the transporter bar if desired. By this means, loads can be placed with great facility on any part of the vehicle.

And in order that the invention may be better understood, it will now be described with reference to the drawings accompanying this specification in which:—

Figs. 1, 2 and 3 show somewhat diagrammatic perspective views of a motor road vehicle fitted with one form of crane made according to the invention in various positions.

Figs. 4, 5 and 6 show other similar perspective views of another form of the invention.

Figs. 7 and 8 show details of constructions hereinafter referred to.

Figs. 9, 10, and 11 to 14 show fragmentary views illustrating three different methods of operating a crane made according to the invention.

Figure 7:
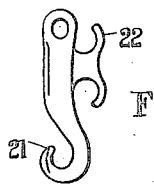

Referring to Figs. 1 to 3, 12 is a motor vehicle having bearing members 13 attached at the sides thereof towards the rear. An inverted U shaped member consisting of sides 14 and a connecting top 15, pivoted by means of the sides 14 at 16 to the bearing members 13. These sides 14 may be extended into handles 17, 18 is a hook pivotally carried by the top 15. It will be seen that the crane comprised by the inverted U member can be turned on the pivots 16, so as to project beyond the rear of the vehicle (see Fig. 2). In this position it can pick up a suitable load, for instance the barrel 20 preferably by using tackle 19 attached to the hook 18. The free end of the rope or chain or cable of the tackle can be suitably fastened off, for instance by means of the cleat 21 of the hook 22 shown in Fig. 7, which may be the lower hook of the tackle, and then the load can be swung inboard, see Fig. 3, until the load comes on to the floor of the vehicle, or it may be turned inboard and lowered by the tackle. It should of course be understood that both handles 17 may be used to carry out the operations or only one and in some cases only one handle need be provided.

Figure 8:
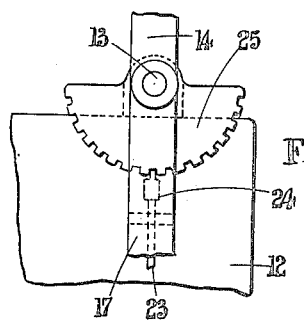

In some instances a positive gate lock may be employed such for instance as that indicated in Fig. 8, where 23 is a rod sliding in suitable guides on the extension 17, and operating a catch 24 adapted to be kept pressed into engagement with the notched gate 25 fixed to the side of the vehicle around the pivot 16. The rod 23 is withdrawn by an ordinary gate release lever (not shown) lying at the side of the extension 17. In place of the hook 18 only being pivotally attached to the top 15, it may be dependent from a flanged wheel or the like adapted to travel on the top 15, so that the load lifted may be lowered where required on the vehicle.

Referring now to Figs. 4-6, in this construction other bearing members 26 are provided and another inverted U shaped member 27. The U member composed of the sides 14 and top 15 is slightly altered by the omission of the top 15, although of course if desired this may be included. 28 are link bars or runners, uniting into a parallel link construction (as shown), the sides 14 and the U member 27. 29 are flanged wheels mounted so as to run on the runners 28 and connected together by a transverse runner 30, on which a flanged wheel 31 with the dependent hook 18 is adapted to run. The upper ends of the sides 14 constitute stops for the flanged wheels 29.

As will be understood when using this form of the device the load 32 can be attached (Fig. 4) and raised, then swung inboard (Fig. 5) and finally disposed where required by the combined operation of the runners 28 and 30 (Fig. 6).

Handles 17 could if desired be provided for each of the side members and in this manner four would be provided; or in some cases only one or more would be provided, or detachable handles 17. Again although the member 27 is a complete U it need only be two side members and the other side members 14 could be connected together to form a complete U.

The crane as previously explained can be made to operate in any particular way required by combining with it any desired mechanism which may be operated by manual or other power. In the latter case this may be obtained from any suitable source for instance the engine of a motor vehicle.

Figure 9:
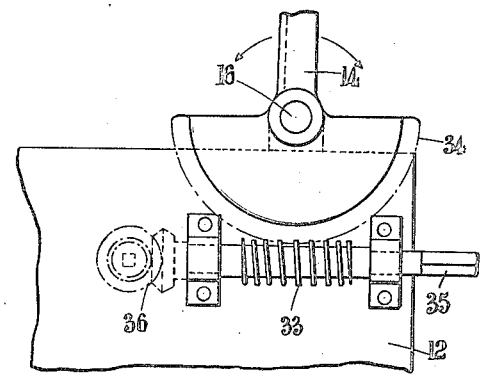

In Fig. 9, a worm 33 and a portion of a worm wheel 34 are provided to operate the arm 14 by means of a handle (ratchet or otherwise) engaging the shaft 33. In place of a direct drive this may be through the bevel gears 36. A flexible shaft suitably driven from any source could also be used if desired to drive the shaft 35.

Figure 10:
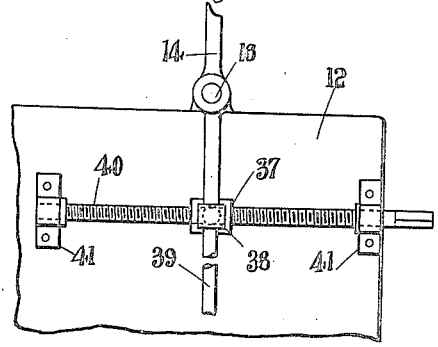

A travelling nut 37 is provided in Fig. 10, carrying a pivoted guide 38 through which an extension 39 of the side 14 is adapted to work. The nut 37 is threaded on the rotatable but longitudinally fixed screwed shaft 40 carried in bearings 41 and operated from a handle or other means.

Figure 11:
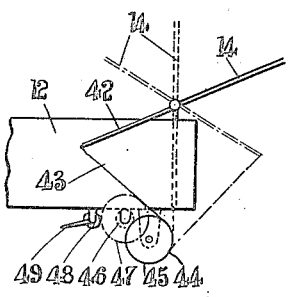

Referring to Fig. 11, in this case the extension 42 of the side 14 has connected thereto a chain, cable rope or the like 43 the other end of which is connected to and passes around a grooved roller or drum 44 carried in suitable bearings beneath the vehicle. Mounted on the same shaft as the drum 44 is a gear wheel 45, with which meshes a pinion 46 having formed therewith or mounted on the same shaft is another gear wheel 47, with which meshes a pinion 48. The shaft of this latter pinion has mounted thereon a handle 49. When the extension is in the full line position of Fig. 11, upon turning the handle 49 in a suitable direction, the cable or the like 43 is wound upon the drum 44 until the side and extension become vertical. Now upon a slight movement they may be turned inboard and the handle turned in the opposite direction.

Figs. 9, 10 and 11 are given merely by way of example and many other forms may be designed. With these and other forms it is obvious that an operating mechanism intergeared or otherwise may be employed at each or any of the hinged joints of the arms.

Figs. 12, 13 and 14 show a construction by way of example whereby the movement of the U shaped member about its pivot to raise or lower the load may be arranged to automatically pay out and draw in the rope or cable by which the load is raised. In the construction illustrated it will be seen that the U-shaped member is formed of sides 14 and a connecting top 15 as in the construction according to Figs. 1–3. Pivotally connected to each side 14 near its point of connection to the bearing member 13 is a rod or link 50 the outer end of which is pivoted to the end of a second rod or link 51, the opposite end of the latter being pivoted to the body of the vehicle. The rope or the like 19a is attached to the link mechanism at or near the point of connection 52 between the links 50 and 51 and passes over a swivelling pulley 53 at the top of the side 14 and then inwardly towards the centre over a pulley 54 on the connecting top 15, and downwardly for attachment to the load.

The lengths of the links 50 and 51 are so selected that when the U-shaped member is swung outwardly, the point of connection 52 between links 50 and 51 approaches the top of the crane so that the rope 52 is paid out, whilst when the crane is moved in the opposite direction to raise the load, the length of the rope between the pulley 54 and the point of attachment to the load is shortened automatically. By this means the load will be raised to its maximum height when the U shaped member is in the vertical position and when moved inwardly over the body of the vehicle the load will be again lowered, on to the body ready to be attached.

The links 50 and 51 or either of them are preferably provided with spaced holes 55, for the reception of a removable connecting bolt.

In order to distribute the load evenly over the sides of the U shaped member, each side thereof may be provided with a pulley 53, the rope passing to a single central pulley 54, so that the portion of the rope to which the load is attached is formed as a loop as shown in Fig. 14.

Where desired in all cases the crane or operating mechanism may be made detachable or foldable. In some cases for strength where employed the lower handle like extensions of the U cranes may be connected together at the bottom. Tackle suitably connected to the vehicle may be employed for turning the cranes on their joints. Although in most forms described the operation takes place at a point below the centre of the crane in some cases the sides such as 14 may be operated above the centre. The preliminary lifting, for instance, by means of the tackle 19 is not always required, as the engaging means carried for instance by the top bar 15 may be connected directly to the load. In some cases, however, the movement of the cranes may serve to operate the ropes or the like of the tackle.

Any convenient locking or securing means may be provided for retaining the U member in any required positions according to requirements.

It is obvious that the U members may be made in any manner and form, and of any suitable section material for example the U member may have two side vertical members of suitable section made in one or built up and a top bar similarly formed coming at right angles to the side members and suitably fastened thereto. In some cases the top bar could be dispensed with and replaced by an equivalent part, for example the transporter bar with flanged wheels. Further in the instance where the second U member is provided near the front of the vehicle to form a parallel motion, this top bar could be entirely dispensed with.

The sides of the inverted U shaped members may if desired be bent to any suitable angle or shape. This applies particularly to the parts extending below the pivots, which might be formed or bent to about a right angle and lie along the side of the vehicle, giving a good leverage, and being advantageous to trucks or the like with the platform near the ground.

In other cases an actuating lever or levers could be attached in any adjustable manner if desired above the pivots to come at a suitable angle.

In some instances the sides of the U members could be made adjustable to give greater or less height; this might be effected by sliding one part on another and fastening in the desired position or by having a series of apertures for the pivots. The top bar also could be made similarly adjustable.

The means for hoisting the load vertically, or for moving the crane, about its pivots could be controlled either manually or by power. In the latter instance, the power of the engine (in the case of a power driven vehicle) could be utilized through suitable gearing or other mechanism, to carry out either or both of these actions.

With most vehicles especially road vehicles it is more convenient to load from the rear, but with some vehicles for example railway trucks, it is better to load from the side. This latter is also preferable in dealing with certain loads (for instance girders and the like) for road vehicle. For these reasons, although the invention has been described generally to vehicles and the like loading from the back, it should be understood that the parts may be so disposed where desired for loading at one or both sides.

In some cases rails or adjustable handles could be fitted to the side members, above or below the hinge to facilitate hauling up and down and turning.

It is obvious that the devices can be fitted to a covered vehicle it merely being necessary to shape the parts to clear the cover.

Where required with any of the forms of the invention counterbalance weights, for instance on the arms could be employed.

Although certain constructional forms of the invention have been described, the invention must not be regarded as limited thereto, but modifications of detail in the construction and arrangement may be made without departing from the principle of the invention.

What I claim as my invention and desire to secure by Letters Patent of the United States of America is:—

In combination with a vehicle body, a plurality of inverted U-shaped cranes arranged transversely there across and in spaced relation, said cranes being pivotally mounted on the body for swinging movement forwardly and rearwardly, one side of one of the cranes being provided with an extension which projects downwardly below the pivot and forms a handle lever whereby said crane may be manually operated, and links connecting said cranes together for simultaneous movement and hoisting means including a member having wheels arranged to operate on said links.

In witness whereof I affix my signature.

ALBERT EDWARD GOODGER.

Witnesses:
WM. PIERCE,
E. J. McDEVITT.